UNITED STATES PATENT OFFICE.

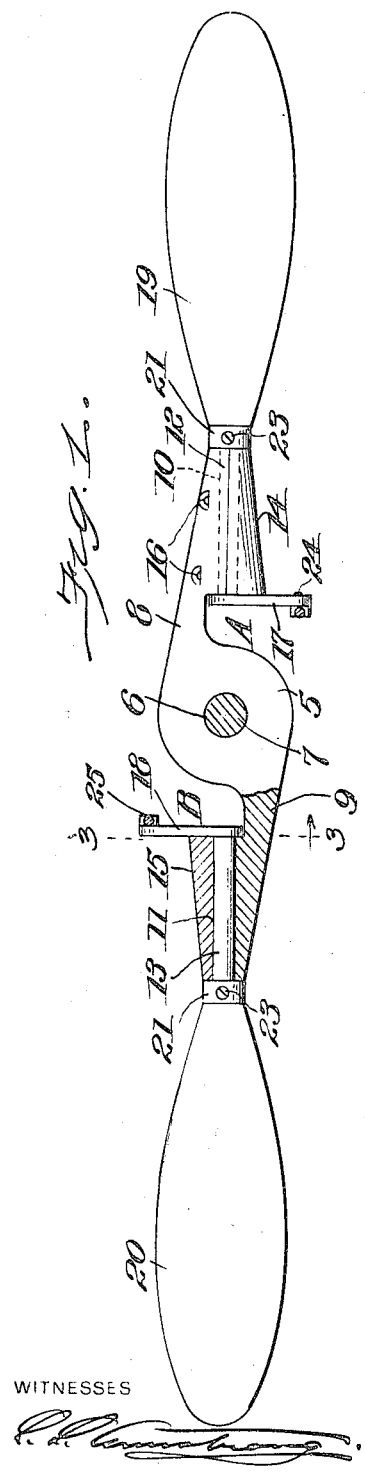

ARTHUR R. LYONS, OF CARROLL, IOWA.

REVERSING PROPELLER.

1,348,432.

Specification of Letters Patent.

Patented Aug. 3, 1920.

Application filed December 6, 1917. Serial No. 205,857.

*To all whom it may concern:*

Be it known that I, ARTHUR R. LYONS, a citizen of the United States, residing at Carroll, in the county of Carroll and State of Iowa, have invented certain new and useful Improvements in Reversing Propellers, of which the following is a specification.

This invention is a propeller more particularly adapted for use in airships or other aerial vessels, wherein the blades of the propeller may be reversed without the employment of reversing gears and without resorting to reversing the prime mover to change the rotation of the driving shaft.

One object of the invention is to provide a propeller with rotatably mounted blades that may be rotated through an arc of approximately 180° to produce a change of direction in the object propelled.

Another object of the invention is to provide a propeller with a hub having oppositely extending arms or brackets that are adapted to rotatably mount blades so that the blades extend at substantially right angles to the hub.

A further object of the invention is to provide a propeller with a hub that carries rotatable blades, whose positions may be changed by suitable arms connected with a slidable member mounted upon the main driving shaft.

A still further object of the invention is to provide a propeller, the blades of which are reversible by the movement of a member, slidable on the driving shaft, that is connected by means of arms and links with one end of each of the blades, the movement of which member causes a rotation of the blades on their longitudinal axes.

Broadly stated, the invention comprises a hub bored to receive a main driving shaft, a plurality of arms extending outwardly from the hub and at substantially right angles to the bore, said arms extending approximately at a tangent to the hub, each of the arms being bored longitudinally to receive a shaft that carries at one end a propeller blade, arms secured to the end of each one of the shafts, links connected with each of the arms, a member slidable on the main driving shaft having a plurality of spaced grooves on its periphery, a collar engageable with one of the grooves and provided for connection with the links, a yoke member being adapted to engage with another groove, said yoke member being suitably connected with means for causing said slidable member to move on the shaft and thereby cause the propeller blades to rotate and change their position for propelling.

One practical form of construction and assembly will be described and illustrated in the accompanying drawings, in which:—

Figure 1 is an elevation of the assembled propeller with one of the arms of the hub shown in section, Fig. 2 is a top plan view of the assembled propeller with the means for shifting the position of the blades, and Fig. 3 is a sectional view on the line 3—3 of Fig. 1.

In the preferred embodiment about to be described, a hub 5 is provided that preferably is formed of metal. The hub has a bore 6 that is adapted to receive a shaft 7. The shaft 7 constitutes the main driving shaft and the hub 5 may be secured thereon by any usual or customary means.

The hub 5 is provided with two arms indicated at 8 and 9 that extend outwardly from the hub and upon opposite sides thereof. As shown the arms 8 and 9 are arranged so that they extend at a tangent with the periphery of the hub. These arms are bored longitudinally as indicated at 10 and 11 to receive the shafts 12 and 13. As shown the arms 8 and 9 are provided with the bearing caps 14 and 15. These caps may be secured upon the arms 8 and 9 by any usual or customary means such as is indicated by the cap screws 16.

The arms 8 and 9 are so arranged that the recesses A and B are formed between the caps 14 and 15 and certain portions of periphery of the hub 5. These recesses are of sufficient width to provide for the mounting of the arms 17 and 18. These arms may be secured to the ends of the shafts 12 and 13 in any usual or customary manner.

The shafts 12 and 13 are mounted within the arms 8 and 9 and held thereon by means of the caps 14 and 15 having their other ends secured to the blades 19 and 20. The blades 19 and 20 where they are secured to the shafts 12 and 13 are provided with collars 21 and 22 that provide a spacing means between the blades 19 and 20 and the ends of the arms 8 and 9 and their respective bearing caps. These collars 21 and 22 may be held in position by suitable fastening means such as is indicated by the screws 23.

As shown in the several figures when the caps 14 and 15 are in position upon the arms 8 and 9 they are tapered from the recesses A and B to the collars 21 and 22. The manner of constructing the arms in their outer portions where they are connected with the bearing caps 14 and 15 may thus serve as counterbalanced masses whose radius of gyration is approximately the same at all times during the rotation of the hub. This will produce a fly wheel effect and at the same time the balance masses lie relatively close to their geometric axis.

The arms 17 and 18 which are secured to the shafts 12 and 13 are pivotally connected as indicated at 24 and 25 with the links 26 and 27. These links are pivotally connected as indicated at 28 and 29 with an annular member 30 that is provided with suitable lugs or ears 31 and 32. This annular member 30 is so constructed that it is adapted to ride in a groove 33 formed in a slidable member 34. The slidable member 34 is preferably circular in outline and is bored to slide upon the driving shaft 7.

The slidable member 34 is also provided with a groove 35 that is spaced from the groove 33. In order to produce a movement in the slidable member 34 the groove 35 is provided with a riding member 36. This riding member is pivotally connected at 37 with the yoke member indicated at 38. The upper end of the yoke member 38 is connected at 39 with an arm 40. This arm 40 is pivotally connected at 41 with an operating rod 42.

The connection 39 includes a transverse rod indicated at 43. This transverse rod 43 is preferably carried in spaced bearings 44 and 45 that serve to maintain the alinement of the rod. These bearings may be secured to a support in any usual manner such as is indicated by the bolts 46.

The operation of the yoke member 34, when acted upon by the operating rod 42 tends to cause the slidable member to move in accordance with a push or pull of said operating rod 42. The yoke member 38 is thus rocked with the shaft 43 in the bearings 44 and 45. As the slidable member 34 moves it causes a rotation of the shafts 12 and 13 by means of the links 26 and 27 and the arms 17 and 18. Thus the blades 19 and 20 may be rotated through an arc of approximately 180° which will cause them to propel in two different directions and with varying degrees of propelling power that lies between the limits of movement of rotation.

The blades may be placed in a neutral or non-propelling position as when starting the engine. As the blades are adapted to be rotated, they may be turned more or less from the maximum propelling positions to any position intermediate. This will permit the engine to rotate at its most economical speed, and in starting, the engine may be adjusted without propeller action.

What is claimed is:—

A reversible propeller comprising a hub having a pair of arms extending tangentially from the periphery of the hub and carrying rotatable blades having their longitudinal centers in the same plane as the center of the said hub and adapted to independently rotate, operating levers secured to the propeller blades at the opposite sides of said hub, and means for actuating said levers.

In testimony whereof I affix my signature in presence of two witnesses.

ARTHUR R. LYONS.

Witnesses:
 LU VERNE LYONS,
 H. M. LYONS.